(12) United States Patent
Nagata (10) Patent No.: US 11,545,035 B2
(45) Date of Patent: Jan. 3, 2023

(54) DRIVER NOTIFICATION SYSTEM

(71) Applicant: Toyota Motor Engineering & Manufacturing North America, Inc., Plano, TX (US)

(72) Inventor: Katsumi Nagata, Foster City, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 48 days.

(21) Appl. No.: 16/685,746

(22) Filed: Nov. 15, 2019

(65) Prior Publication Data

US 2021/0150904 A1 May 20, 2021

(51) Int. Cl.
| | | |
|---|---|---|
| *G08G 1/16* | (2006.01) | |
| *G08G 1/0967* | (2006.01) | |
| *B60K 35/00* | (2006.01) | |
| *B60Q 5/00* | (2006.01) | |
| *B60Q 9/00* | (2006.01) | |

(52) U.S. Cl.
CPC ............. *G08G 1/166* (2013.01); *B60K 35/00* (2013.01); *B60Q 5/006* (2013.01); *B60Q 9/008* (2013.01); *G08G 1/096791* (2013.01); *B60K 2370/157* (2019.05); *B60K 2370/1529* (2019.05); *B60K 2370/166* (2019.05); *B60K 2370/178* (2019.05); *B60K 2370/179* (2019.05); *B60K 2370/193* (2019.05)

(58) Field of Classification Search
CPC .. G08G 1/166; G08G 1/096791; B60K 35/00; B60K 2370/1529; B60K 2370/166; B60K 2370/178; B60K 2370/193; B60K 2370/157; B60K 2370/179; B60Q 5/006; B60Q 9/008
See application file for complete search history.

(56) References Cited

U.S. PATENT DOCUMENTS

| | | |
|---|---|---|
| 7,783,403 B2 | 8/2010 | Breed |
| 9,126,594 B2 | 9/2015 | Kawamata et al. |
| 9,483,947 B2 | 11/2016 | Strassberger |
| 10,115,314 B2 | 10/2018 | Boegel |
| 10,229,597 B2 | 3/2019 | Bostick et al. |
| 10,254,764 B2 | 4/2019 | Laubinger et al. |
| 10,293,750 B2 | 5/2019 | Brubaker |

(Continued)

FOREIGN PATENT DOCUMENTS

EP  2830920 B1  5/2018

*Primary Examiner* — Quan Zhen Wang
*Assistant Examiner* — Mancil Littlejohn, Jr.
(74) *Attorney, Agent, or Firm* — Snell & Wilmer LLP (57) ABSTRACT

Methods and systems for notifying a driver of a first vehicle of obstacles discouraging passing of a second vehicle in front of the first vehicle. The system includes a sensor of the second vehicle configured to detect spatial data in proximity of the second vehicle. The system also includes an electronic control unit (ECU) of the first vehicle. The ECU is configured to receive the spatial data from a transceiver of the second vehicle. The ECU is also configured to determine obstacle data based on the spatial data, the obstacle data identifying a presence of obstacles ahead of the second vehicle discouraging passing of the second vehicle by the first vehicle. The ECU is also configured to provide a notification to the driver of the first vehicle when the obstacle data indicates the presence of obstacles ahead of the second vehicle.

20 Claims, 8 Drawing Sheets

(56) References Cited

U.S. PATENT DOCUMENTS

| | | |
|---|---|---|
| 10,331,142 B2 | 6/2019 | Bar-Tal et al. |
| 2008/0091352 A1* | 4/2008 | O'Hare ................. G08G 1/163 340/436 |
| 2012/0188374 A1* | 7/2012 | Taner .............. B60W 30/18163 348/148 |
| 2014/0247160 A1 | 9/2014 | Glascock |
| 2017/0076598 A1* | 3/2017 | Scofield ............... G07B 15/063 |
| 2017/0101102 A1* | 4/2017 | Matei ....................... G08G 1/00 |
| 2018/0090009 A1 | 3/2018 | Roessler et al. |
| 2018/0188746 A1 | 7/2018 | Lesher |
| 2018/0203457 A1* | 7/2018 | Moosaei ................ G08G 1/167 |
| 2018/0236939 A1 | 8/2018 | Smith |
| 2019/0054922 A1 | 2/2019 | Yalla et al. |
| 2019/0096244 A1 | 3/2019 | Guruva et al. |
| 2019/0202476 A1* | 7/2019 | Tao ..................... B60W 30/095 |
| 2020/0056892 A1* | 2/2020 | Haque .................. G06K 9/6273 |
| 2020/0164799 A1* | 5/2020 | Nowakowski ............ B60R 1/00 |
| 2020/0164881 A1* | 5/2020 | Rakshit ................ G05D 1/0088 |

\* cited by examiner

DRIVER NOTIFICATION SYSTEM

BACKGROUND

1. Field

This specification relates to a system and a method for providing driver notifications with respect to nearby vehicles.

2. Description of the Related Art

Drivers of vehicles use mirrors and their view out of windows to determine whether a maneuver is safe. For example, when making a lane change, a driver may look at a rear-view mirror, a side mirror, and over the driver's shoulder through a side window to determine whether there is another vehicle in the adjacent lane that the driver would like to change into. When slower vehicles are in a passing lane, the driver may take an aggressive maneuver to pass the slower vehicles due to frustration of being stuck behind the slower vehicles. A driver may change lanes as a first step in passing a vehicle in front of the driver. However, there may be situations where the driver changes lanes, only to discover that there is another vehicle in front of the vehicle-to-be-passed. The driver was unable to visually see the other vehicle, as the vehicle-to-be-passed was obstructing the driver's view. In these situations, the driver may attempt to fit between the other vehicle and the vehicle-to-be-passed, attempt to pass both vehicles, or return back to being behind the vehicle-to-be-passed. The driver may never have changed lanes had the driver known that there was another vehicle in front of the vehicle-to-be-passed. Thus, there is a need for systems and methods for informing drivers of the presence of vehicles obstructed by other vehicles.

SUMMARY

What is described is a system for notifying a driver of a first vehicle of obstacles discouraging passing of a second vehicle in front of the first vehicle. The system includes a sensor of the second vehicle configured to detect spatial data in proximity of the second vehicle. The system also includes an electronic control unit (ECU) of the first vehicle. The ECU is configured to receive the spatial data from a transceiver of the second vehicle. The ECU is also configured to determine obstacle data based on the spatial data, the obstacle data identifying a presence of obstacles ahead of the second vehicle discouraging passing of the second vehicle by the first vehicle. The ECU is also configured to provide a notification to the driver of the first vehicle when the obstacle data indicates the presence of obstacles ahead of the second vehicle.

Also described is a system for notifying a driver of a first vehicle of obstacles discouraging passing of a second vehicle in front of the first vehicle. The system includes a sensor of the second vehicle configured to detect spatial data in proximity of the second vehicle. The system also includes an electronic control unit (ECU) of the second vehicle. The ECU is configured to determine obstacle data based on the spatial data, the obstacle data identifying a presence of obstacles ahead of the second vehicle discouraging passing of the second vehicle by the first vehicle. The ECU is also configured to communicate the obstacle data to the first vehicle via a transceiver of the second vehicle. The system also includes an ECU of the first vehicle configured to provide a notification to the driver of the first vehicle when the obstacle data indicates the presence of obstacles ahead of the second vehicle.

Also described is a method for notifying a driver of a first vehicle of obstacles discouraging passing of a second vehicle in front of the first vehicle. The method includes detecting, by a sensor of the second vehicle, spatial data in proximity of the second vehicle. The method also includes determining, by an electronic control unit (ECU) of the first vehicle or an ECU of the second vehicle, obstacle data based on the spatial data, the obstacle data identifying a presence of obstacles ahead of the second vehicle discouraging passing of the second vehicle by the first vehicle. The method also includes providing a notification to the driver of the first vehicle when the obstacle data indicates the presence of obstacles ahead of the second vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for assisting drivers of vehicles when passing another vehicle. In some situations, a driver of a vehicle would like to pass the vehicle in front of it. The driver may change lanes to begin the passing maneuver only to discover another vehicle in front of the vehicle-to-be-passed. The vehicle-to-be-passed had obstructed the view of the other vehicle to the driver. Had the driver known about the presence of the other vehicle in front of the vehicle-to-be-passed, the driver may not have changed lanes to begin the passing maneuver. The systems and methods described herein provide a notification to the driver about the presence of other vehicles that may be outside the field of vision of the driver, such as vehicles in front of the vehicle-to-be-passed.

The systems and methods described herein use sensors on other vehicles to provide data which may be used to provide a notification to the driver about vehicles or other obstructions that may not be in the driver's field of vision. By using this additional data, the driver of the vehicle is able to make a more informed decision about changing lanes and performing passing maneuvers than relying solely on the driver's faculties and onboard vehicle sensors alone.

The safety of the driver, the occupants of the driver's vehicle, and the safety of other vehicles and occupants therein are improved, as the systems and methods described herein allow the driver to be aware of any other vehicles outside the driver's field of vision, allowing the driver to operate the vehicle in a more controlled, predictable manner. When many vehicles use the systems and methods described herein, the safety of all vehicles, in aggregate, is improved.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

Figure 1:
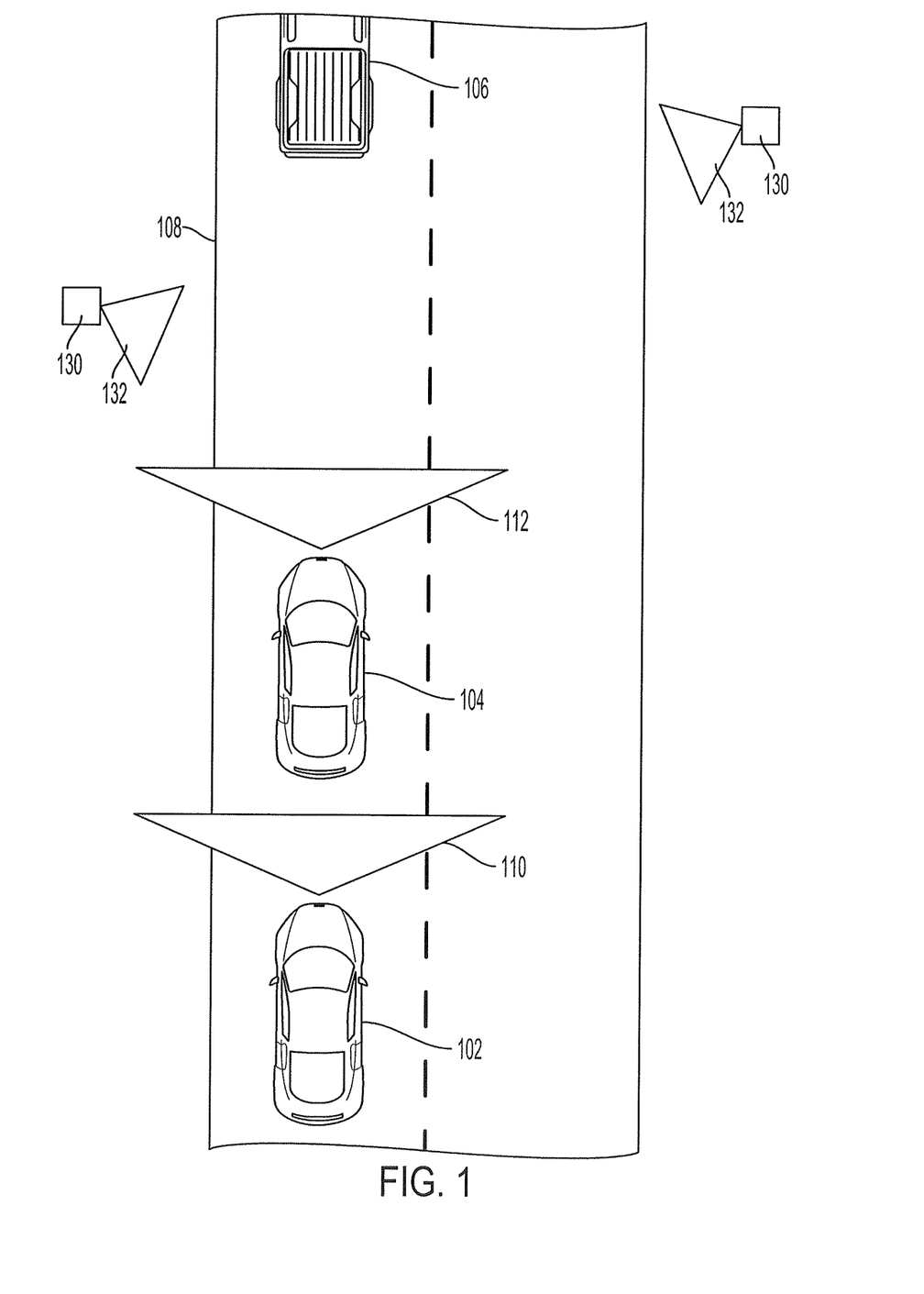
FIG. 1 illustrates an overhead view of vehicles travelling over a road and their respective fields of vision, according to various embodiments of the invention.

FIG. 1 illustrates a road 108 and vehicles (e.g., first vehicle 102, second vehicle 104, and third vehicle 106) travelling thereon. A driver of the first vehicle 102 may have a first field of vision 110 and the driver of the second vehicle 104 may have a second field of vision 112. When the driver of a vehicle is a human being, the respective field of vision may refer to the field of vision available to the driver using the driver's eyes. When the vehicle is autonomously operated, the respective field of vision may refer to the field of vision available to one or more image sensors (e.g., cameras or LIDAR) of the vehicle.

Figure 2A:
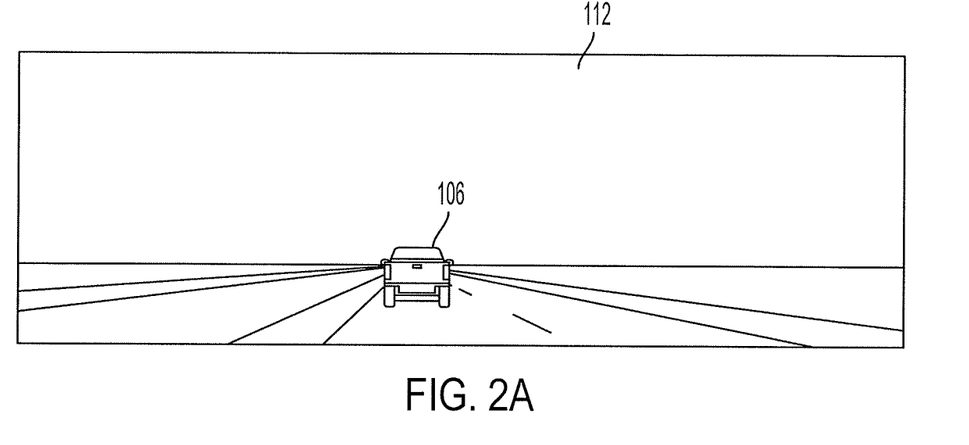
FIGS. 2A and 2B illustrate the fields of vision for the vehicles of FIG. 1, according to various embodiments of the invention.
Figure 2B:
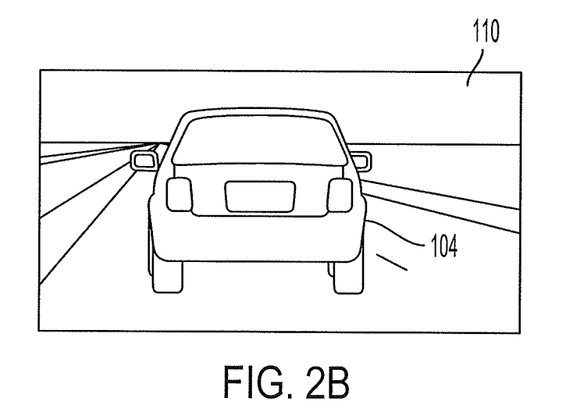

Because the second vehicle 104 is located in front of the first vehicle 102, the first field of vision 110 of the first vehicle 102 is partially obstructed. As a result, the first field of vision 110 (shown in FIG. 2B) does not include the third vehicle 106. However, the third vehicle 106 remains in the second field of vision 112 of the second vehicle 104 (shown in FIG. 2A).

Referring again to FIG. 1, in a situation where the driver of the first vehicle 102 wishes to pass the second vehicle 104, the driver of the first vehicle 102 may change to an adjacent lane, only to realize that another vehicle (e.g., third vehicle 106) is located in front of the second vehicle 104. There may not be enough distance between the second vehicle 104 and the third vehicle 106 to fit between the second vehicle 104 and the third vehicle 106, and there may not be enough clear road available for the first vehicle 102 to safely pass the second vehicle 104 and the third vehicle 106. In these situations, the first vehicle 102 may retreat back to its original position behind the second vehicle 104, the first vehicle 102 may attempt to squeeze in between the second vehicle 104 and the third vehicle 106, or the first vehicle 102 may attempt to race ahead of the second vehicle 104 and the third vehicle 106. None of these maneuvers are ideal for the first vehicle 102, and the driver of the first vehicle 102 may not have changed lanes to attempt to pass the second vehicle 104 in the first place had the driver of the first vehicle 102 known that there was the third vehicle 106 ahead of the second vehicle 104.

In order to better inform the driver of the first vehicle 102, supplemental image data may be provided to the first vehicle 102. For example, image data from an image sensor of the second vehicle 104 may be provided to the first vehicle 102 or image data from a roadside image sensor 130 having a field of view 132 may be provided to the first vehicle 102.

The first vehicle 102 may use the supplemental image data to make the driver of the first vehicle 102 aware of the presence of an obstacle ahead of the second vehicle 104 (e.g., the third vehicle 106).

Figure 3A:
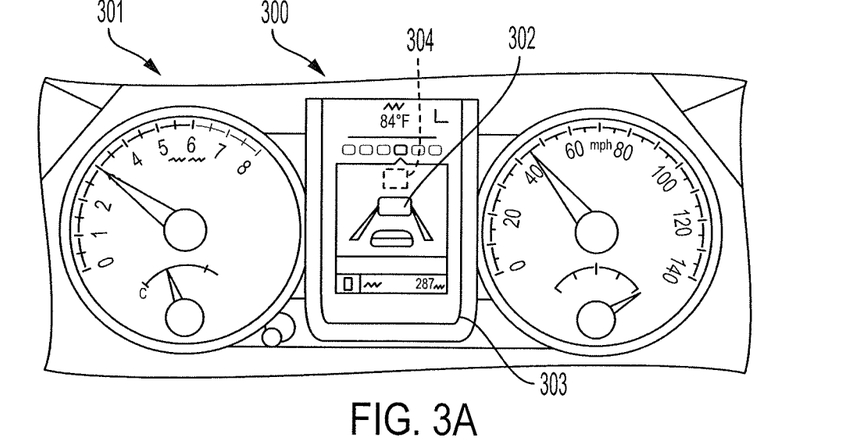
FIGS. 3A-3C illustrate various types of notifications that may be provided to a driver, according to various embodiments of the invention.
Figure 3B:
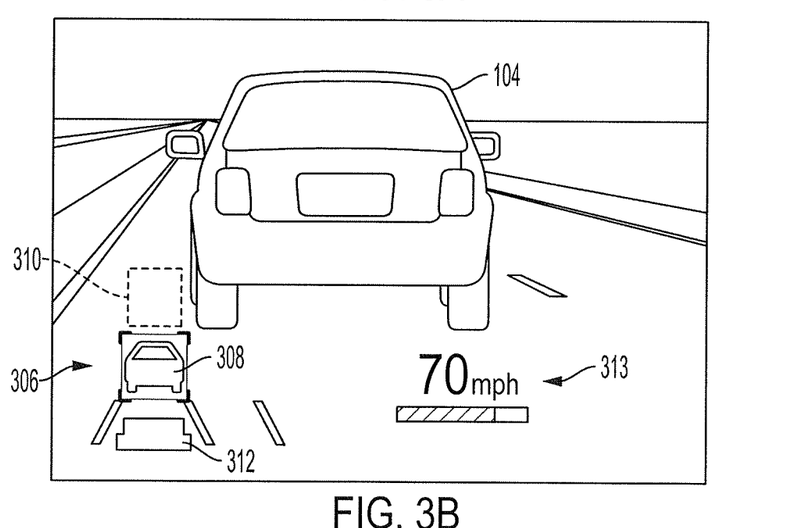
Figure 3C:
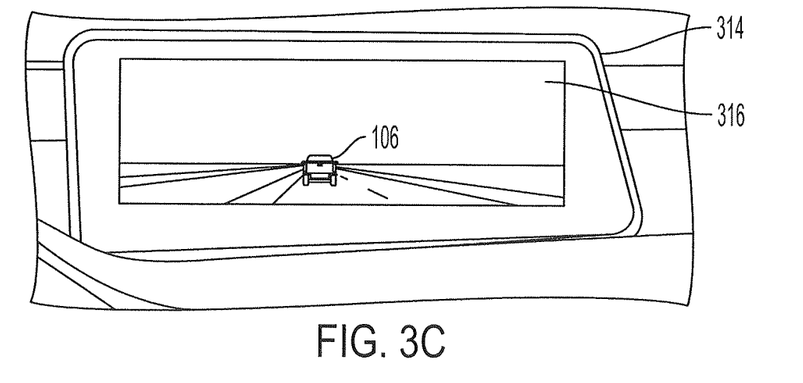

FIGS. 3A-3C illustrate exemplary notifications that may be provided to a driver of the first vehicle 102 to inform the driver of the first vehicle 102 of any obstacles ahead of the second vehicle 104 that may be obscured by the second vehicle 104.

FIG. 3A illustrates an instrument panel 301 of the first vehicle 102. The instrument panel 301 may include a user interface 300 displayed by a display screen 303. The user interface 300 may be rendered by a control unit of the first vehicle 102 (e.g., an ECU). The user interface 300 includes an icon 302 representing the second vehicle 104 and an icon 304 representing the third vehicle 106. The first vehicle 102 may receive spatial data from the second vehicle 104. The spatial data may indicate the presence of an obstacle ahead of the second vehicle 104. The spatial data may be image data detected by an image sensor of the second vehicle 104. The spatial data may be proximity data detected by a remote sensor, such as RADAR or LIDAR of the second vehicle. The spatial data may be vehicle data (e.g., vehicle speed, acceleration) of the second vehicle 104 and the third vehicle 106. The spatial data may be used to determine obstacle data that indicates a location of an obstacle (e.g., a vehicle or object in the road) ahead of the second vehicle 104, relative to the second vehicle 104. In some embodiments, supplemental image data from a supplemental sensor (e.g., a roadside image sensor) may also be used in addition or in lieu of the spatial data from the second vehicle 104.

The first vehicle 102 may use the spatial data received from the second vehicle 104 to determine whether an obstacle is ahead of the second vehicle and whether to display an icon (e.g., icon 304) associated with the obstacle. In some situations, the detected obstacle may be a sufficiently far distance away that the obstacle may not pose a challenge for the first vehicle 102 attempting to pass the second vehicle 104. In these situations, the first vehicle 102 may not display an icon (e.g., icon 304) associated with the obstacle in the user interface 300.

FIG. 3B illustrates a heads up display 306 projected by a heads-up display unit onto a front windshield of the first vehicle 102 in front of the driver. The heads up display 306 may be rendered by a control unit of the first vehicle 102 (e.g., an ECU). The heads up display 306 includes an icon 308 representing the second vehicle 104 and an icon 310 representing the third vehicle 106. The heads up display 306 may also include an icon 312 representing the first vehicle 102. The heads up display 306 may also include additional vehicle information 313, such as a vehicle speed and/or a remaining fuel of the vehicle.

Similar to the rendering of the user interface 300, the heads up display 306 may be rendered based on the first vehicle 102 receiving spatial data from the second vehicle 104, and the spatial data may indicate the presence of an obstacle ahead of the second vehicle 104. The spatial data may be image data detected by an image sensor of the second vehicle 104 or the spatial data may be proximity data detected by a remote sensor, such as RADAR or LIDAR of the second vehicle. The spatial data may be used to determine obstacle data that indicates a location of the obstacle (e.g., a vehicle or object in the road) ahead of the second vehicle 104, relative to the second vehicle 104. In some embodiments, supplemental image data from a supplemental sensor (e.g., a roadside image sensor) may also be used in addition or in lieu of the spatial data from the second vehicle 104. The heads up display 306 may also show virtual information of the spatial data on a front windshield as an augmented reality heads up display.

The first vehicle 102 may use the spatial data received from the second vehicle 104 to determine whether an obstacle is ahead of the second vehicle and whether to display an icon (e.g., icon 310) associated with the obstacle. In some situations, the detected obstacle may be a sufficiently far distance away that the obstacle may not pose a challenge for the first vehicle 102 attempting to pass the second vehicle 104. In these situations, the first vehicle 102 may not display an icon (e.g., icon 310) associated with the obstacle in the heads up display 306.

FIG. 3C illustrates a live view 316 displayed by a display screen 314 of the first vehicle 102. The display screen 314 may be a display screen of an infotainment unit of the first vehicle 102 and within view of the driver. The live view 316 may show image data detected by an image sensor of the second vehicle 104. The live view 316 shows the third vehicle 106. The driver of the first vehicle 102 is able to see the presence of the third vehicle 106 in the live view 316, and operates the first vehicle 102 accordingly. The driver of the first vehicle 102 may determine that there is not sufficient room between the second vehicle 104 and the third vehicle 106, as shown by the live view 316 for the driver of the first vehicle 102 to safely pass the second vehicle 104 and/or the third vehicle 106.

The second vehicle 104 may communicate the image data used in the live view 316 directly to the first vehicle 102 or the second vehicle 104 may communicate the image data used in the live view 316 to a remote data server, which then communicates the image data to the first vehicle 102. In some embodiments, supplemental image data from a supplemental sensor (e.g., a roadside image sensor) may also be used in addition or in lieu of the image data from the second vehicle 104.

In some embodiments, an audible notification is provided using one or more speakers of the first vehicle 102. In some embodiments, a tactile notification is provided using one or more vibration units of the first vehicle 102. The vibration units may be located in the steering wheel or the seat of the driver.

In some embodiments, a timing notification may also be provided, indicating when it is safe for the driver of the first vehicle to pass the second vehicle. It may be safe to pass the second vehicle when the third vehicle is sufficiently far away from the second vehicle or has changed lanes away from the second vehicle. The timing notification may be a countdown displayed or audibly presented counting down to when it is safe to make the maneuver. The countdown timer may be determined based on the relative speed and location of the third vehicle, and environmental data (e.g., map data, traffic conditions, road conditions) may also be taken into consideration. The timing notification may be a different icon that is adjacent to the icon associated with the third vehicle (e.g., icon 304, icon 310). The timing notification may be a different icon that is indicating the distance between the second vehicle 104 and the third vehicle 106 (not shown). When the timing notification indicates it is safe to pass the second vehicle 104, the icon associated with the third vehicle may be removed from the display.

Figure 4:
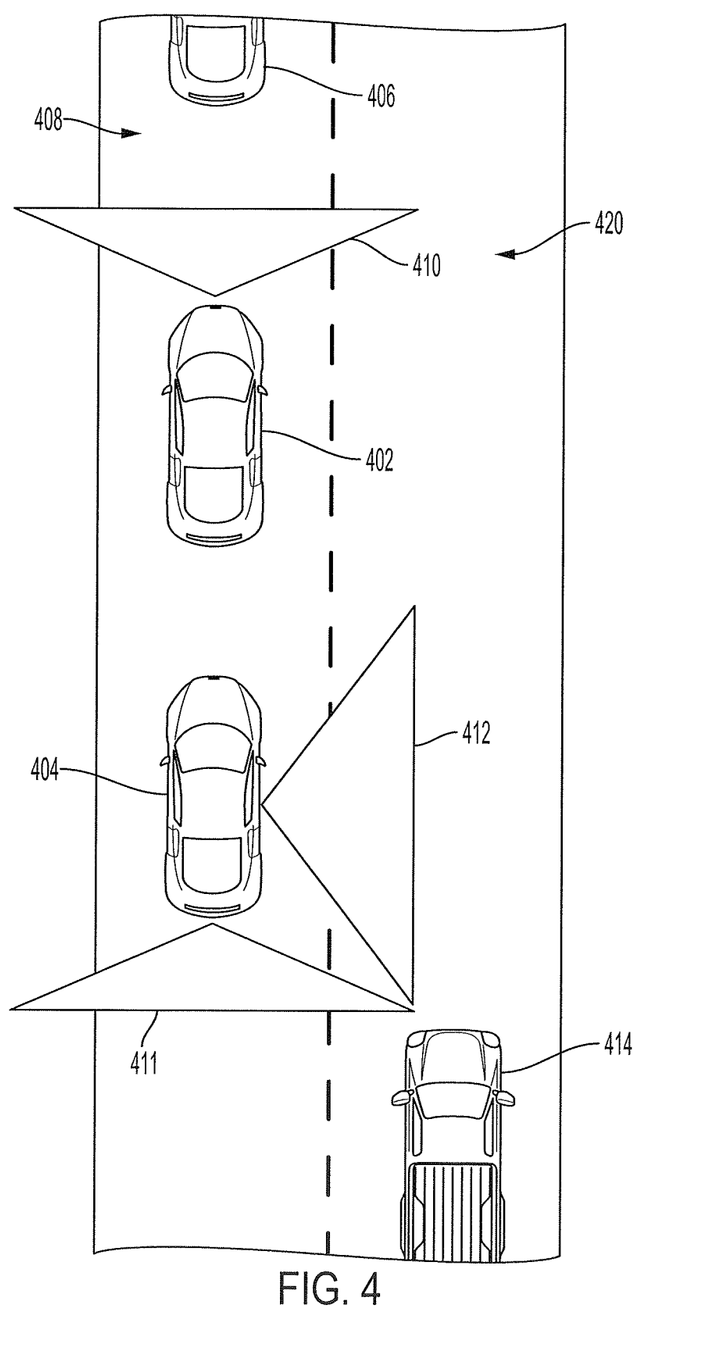
FIG. 4 illustrates an overhead view of vehicles travelling over a road and their respective fields of vision, according to various embodiments of the invention.

The system described herein may also be used generally to determine whether it safe to perform a lane change. This aspect is illustrated in FIG. 4. The first vehicle 402 is driving in a lane 408 behind the second vehicle 406 (which may possibly be behind a third vehicle that is not pictured) and ahead of a fourth vehicle 404. The first vehicle 402 may be interested in moving to an adjacent lane 420 to pass the second vehicle 406. The driver of the first vehicle 402 may look over to the adjacent lane 420 to see if there is a vehicle present that may prevent the first vehicle 402 from safely changing lanes into the adjacent lane 420. In some situations, the driver of the first vehicle 402 may not see a vehicle in the adjacent lane 420 and may change into the lane, only to discover that it was not a safe maneuver. These situations may include the fourth vehicle 404 blocking the fifth vehicle 414 from being seen by the driver of the first vehicle 402 or the fifth vehicle 414 driving at a sufficiently fast speed that it has caught up to the first vehicle 402 during the time between when the driver of the first vehicle 402 looked into the adjacent lane 420 (and did not see any vehicle) and when the driver of the first vehicle 402 maneuvered into the adjacent lane 420. These scenarios may occur more frequently when the fifth vehicle 414 is a compact and fast vehicle, such as a motorcycle.

The first vehicle 402 may use spatial data detected from the fourth vehicle 404 to determine whether a maneuver into the adjacent lane 420 is safe. The fourth vehicle 404 may include a plurality of sensors (e.g., image sensors or remote sensors) configured to detect spatial data around the fourth vehicle 404. For example, the sensors of the fourth vehicle 404 may detect spatial data in a rearward direction 411 behind the fourth vehicle 404 and in a right-side direction 412 to the right of the fourth vehicle 404. The spatial data detected by the fourth vehicle 404 may be used to detect the presence of the fifth vehicle 414. The spatial data is communicated to the first vehicle 402, which may provide a notification to the driver of the presence of the fifth vehicle 414 based on the spatial data detected by the fourth vehicle 404.

Figure 5A:
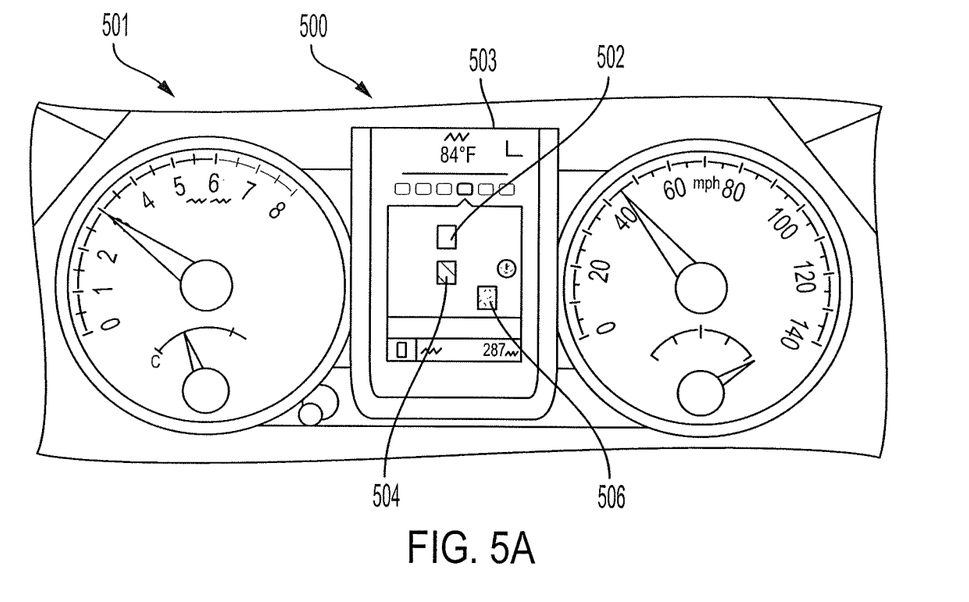
FIGS. 5A-5B illustrate various types of notifications that may be provided to a driver, according to various embodiments of the invention.

FIG. 5A illustrates an instrument panel 501 of the first vehicle 402. The instrument panel 501 may include a user interface 500 displayed by a display screen 503. The user interface 500 may be rendered by a control unit of the first vehicle 402 (e.g., an ECU). The user interface 500 includes an icon 502 representing the first vehicle 402, an icon 504 representing the fourth vehicle 404, and an icon 506 representing the fifth vehicle 414. The first vehicle 402 may receive spatial data from the fourth vehicle 404. The spatial data may indicate the presence of an obstacle near the fourth vehicle 404. The spatial data may be image data detected by an image sensor of the fourth vehicle 404. The spatial data may be proximity data detected by a remote sensor, such as RADAR or LIDAR of the fourth vehicle 404. The spatial data may be used to determine obstacle data that indicates a location of the obstacle near the fourth vehicle 404, relative to the fourth vehicle 404. In some embodiments, supplemental image data from a supplemental sensor (e.g., a roadside image sensor) may also be used in addition or in lieu of the spatial data from the fourth vehicle 404.

The first vehicle 402 may use the spatial data received from the fourth vehicle 404 to determine whether an obstacle is near the fourth vehicle 404 and whether to display an icon (e.g., icon 506) associated with the obstacle. In some situations, the detected obstacle may be a sufficiently far distance away that the obstacle may not pose a challenge for the first vehicle 402 attempting to change lanes. In these situations, the first vehicle 402 may not display an icon (e.g., icon 506) associated with the obstacle in the user interface 500.

Figure 5B:
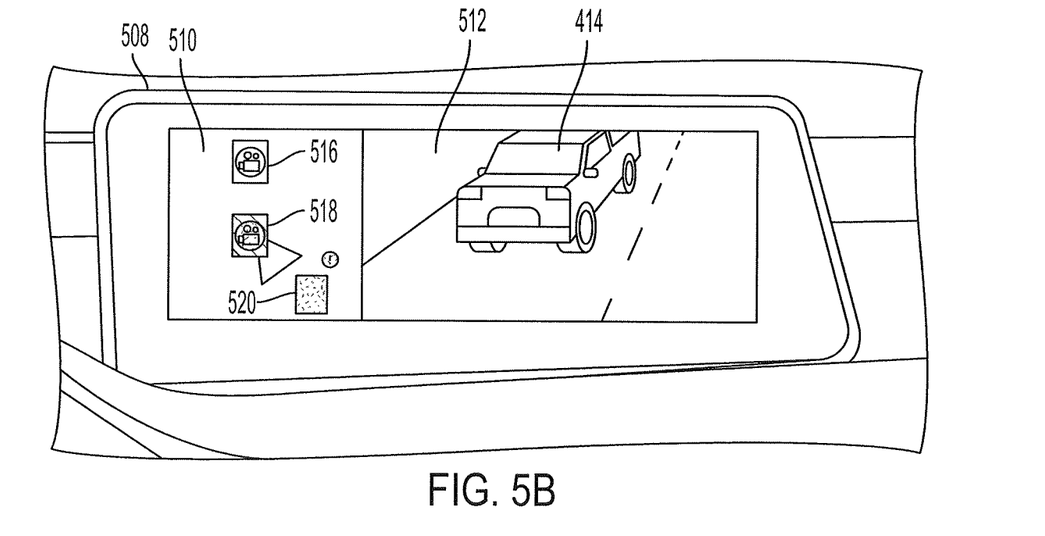

FIG. 5B illustrates a live view 512 displayed by a display screen 508 of the first vehicle 402. The display screen 508 may be a display screen of an infotainment unit of the first vehicle 402 and within view of the driver. The live view 512 may show image data detected by an image sensor of the fourth vehicle 404. The live view 512 shows the fifth vehicle 414. The driver of the first vehicle 402 is able to see the presence of the fifth vehicle 414 in the live view 512, and operates the first vehicle 402 accordingly. The driver of the first vehicle 402 may determine that there is not sufficient room ahead of the fifth vehicle 414, as shown by the live view 512, for the driver of the first vehicle 402 to safely change lanes.

The fourth vehicle 404 may communicate the image data directly to the first vehicle 402 or the fourth vehicle 404 may communicate the image data to a remote data server, which then communicates the image data to the first vehicle 402. In some embodiments, supplemental image data from a supplemental sensor (e.g., a roadside image sensor) may also be used in addition or in lieu of the image data from the fourth vehicle 404.

In addition to the live view 512, the display screen may also render and display relative positioning 510 of the vehicles, similar to the user interface 500 of FIG. 5A. An icon 516 representing the first vehicle 402, an icon 518 representing the fourth vehicle 404, and an icon 520 representing the fifth vehicle 414 may all be shown. The icon 518 of the fourth vehicle 404 may have a different color or other indicator to indicate to the driver of the first vehicle 402 that the image sensor of the fourth vehicle 404 is being used for the live view 512.

In some embodiments, an audible notification is provided using one or more speakers of the first vehicle 402. In some embodiments, a tactile notification is provided using one or more vibration units of the first vehicle 402. The vibration units may be located in the steering wheel or the seat of the driver.

In some embodiments, a timing notification may also be provided, indicating when it is safe for the driver of the first vehicle to change lanes into the adjacent lane 420. It may be safe to change lanes into the adjacent lane 420 when the fifth vehicle 414 has passed the first vehicle 402 or has changed lanes out of the adjacent lane 420. The timing notification may be a countdown displayed or audibly presented counting down to when it is safe to make the lane change. The countdown timer may be determined based on the relative speed and location of the fifth vehicle, and environmental conditions (e.g., map data, traffic conditions, road conditions) may also be taken into consideration. The timing notification may be a different icon that replaces the warning icon associated with the fifth vehicle (e.g., icon 506, icon 520).

In some situations, although a vehicle may not be ahead of the vehicle-to-be-passed, there may be other obstacles that may make passing unsafe. For example, when passing a vehicle would result in the passing maneuver to be performed in an intersection or in a dangerous location in the road, a warning notification may be provided for the driver.

Figure 6:
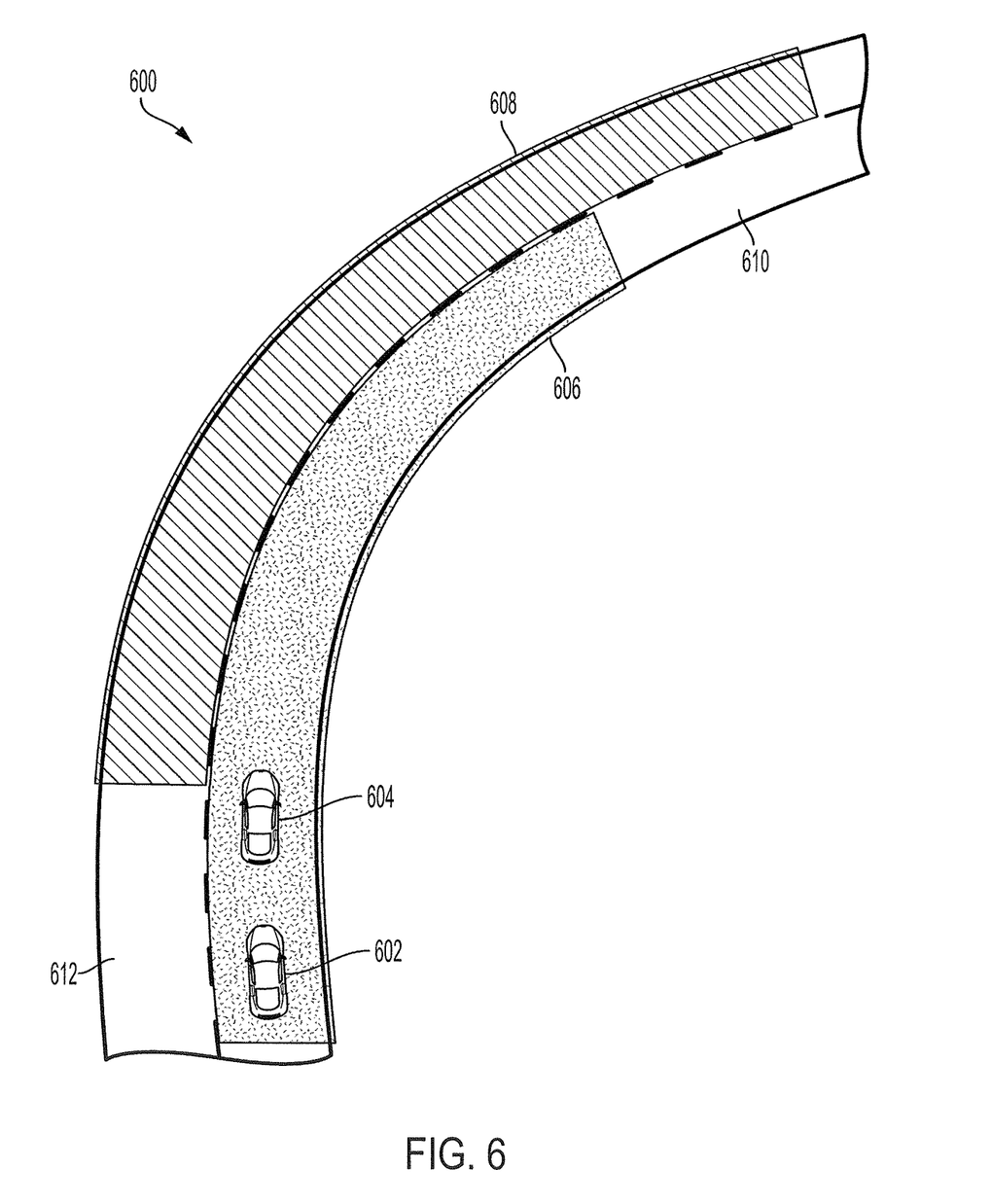
FIG. 6 illustrates use of map data along with image data from other vehicles, according to various embodiments of the invention.

FIG. 6 illustrates an area 600 where a first vehicle 602 is driving behind a second vehicle 604. Using the systems and methods described herein, the driver of the first vehicle 602 may determine that there is no vehicle or other obstacle ahead of the second vehicle 604. However, the first vehicle 602 may provide a warning notification for the driver that it may not be safe to pass the second vehicle 604 due to another obstacle—the shape of the road that is upcoming.

The road may be a two-lane road with a first lane 610 flowing in a first direction of traffic and a second lane 612 flowing in a second direction of traffic, opposite the first direction of traffic. If the first vehicle 602 were to attempt to pass the second vehicle 604 by temporarily changing lanes into the second lane 612, the maneuver may not be safe, as the road is curving significantly, requiring additional vehicle speed from the first vehicle 602 to pass the second vehicle 604. The additional vehicle speed may cause the first vehicle 602 to lose traction and have an accident. In addition, the curve of the road results in reduced visibility of oncoming traffic by the driver of the first vehicle 602 when the first vehicle 602 is in the second lane 612. Thus, attempting to pass the second vehicle 604 may not be recommended.

In some embodiments, when the first vehicle 602 is within a particular geographic area identified as being an unsafe passing area, the first vehicle 602 may warn the driver of the first vehicle 602 against passing maneuvers. The identified geographic area may be stored in a memory of the first vehicle 602 or received by a cloud server. Alternatively, the first vehicle 602 may download the identified geographic area and may store the downloaded geographic area in local memory, or may simply dismiss it. A first unsafe passing area 606 is an example of a geographic area identified as being unsafe for passing and is shown in FIG. 6 along the first lane 610. Once the curve of the first lane 610 is traversed, the first unsafe passing area 606 ends. The unsafe passing areas may be lane-specific, taking the direction of traffic into consideration. Accordingly, a second unsafe passing area 608 along the second lane 612 may start and end at different locations, compared to the first unsafe passing area 606.

Figure 7:
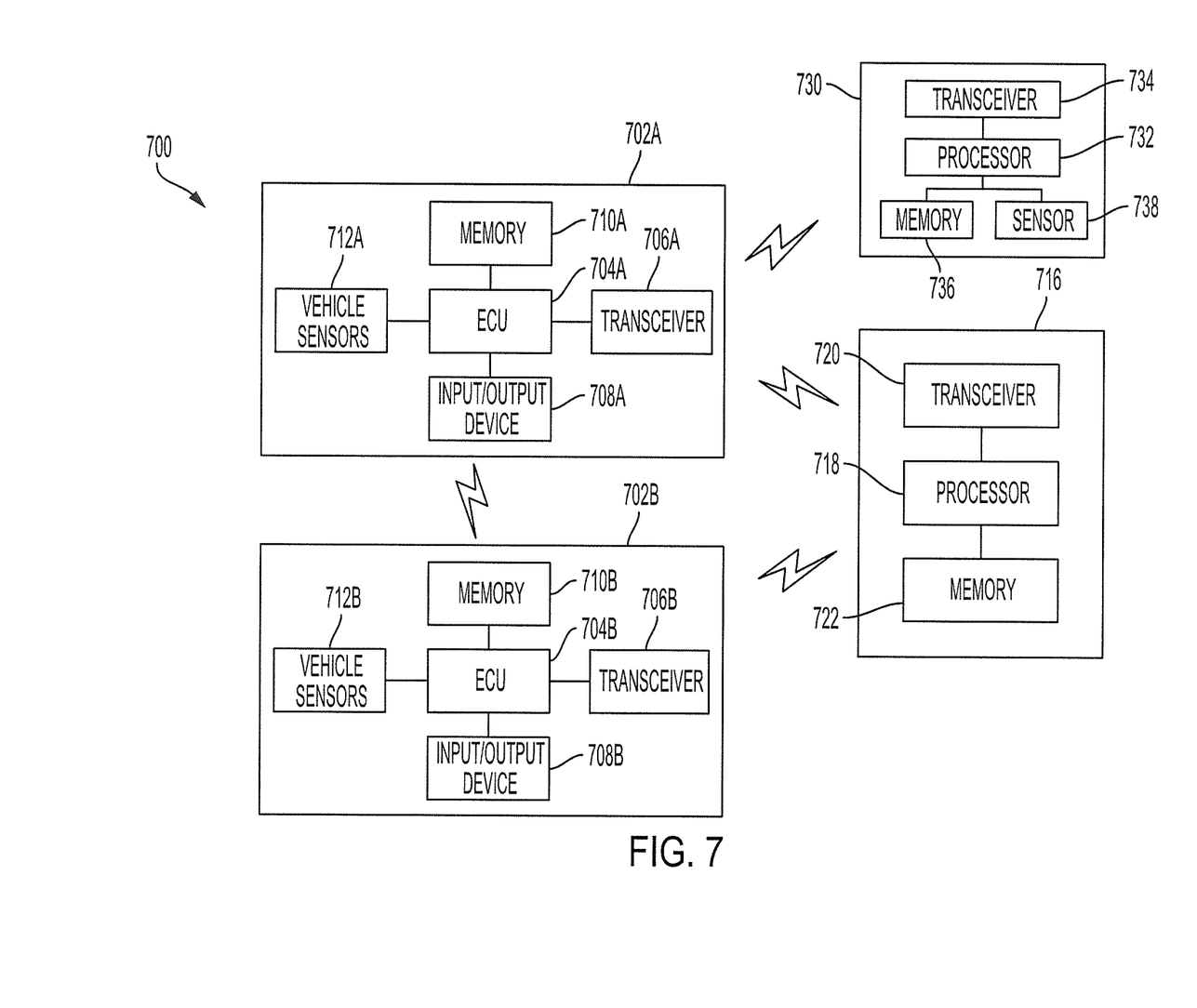
FIG. 7 illustrates a block diagram of components of the system, according to various embodiments of the invention.

FIG. 7 illustrates a system 700. The system 700 includes a first vehicle 702A, a second vehicle 702B, a remote data server 716, and a supplemental imaging device 730. Components having a letter suffix may be referred to collectively or individually by the number before the letter suffix. For example, vehicle 702 may refer to the first vehicle 702A and the second vehicle 702B collectively or may refer to either the first vehicle 702A or the second vehicle 702B individually. The vehicles 702 may be similar to any of the vehicles described herein, such as vehicles 102, 104, 402, 404, 602, or 604.

The vehicle 702 may have an automatic or manual transmission. The vehicle 702 is a conveyance capable of transporting a person, an object, or a permanently or temporarily affixed apparatus. The vehicle 702 may be a self-propelled wheeled conveyance, such as a car, sports utility vehicle, truck, bus, van or other motor or battery driven vehicle. For example, the vehicle 702 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation.

The vehicle 702 may be capable of non-autonomous operation or semi-autonomous operation or autonomous operation. That is, the vehicle 702 may be driven by a human driver or may be capable of self-maneuvering and navigating without human input. A vehicle operating semi-autonomously or autonomously may use one or more sensors and/or a navigation unit to drive autonomously.

The vehicle 702 includes an ECU 704 (e.g., ECU 704A and 704B) connected to a transceiver 706 (e.g., 706A and 706B), input/output device 708 (e.g., 708A and 708B), a memory 710 (e.g., 710A and 710B), and vehicle sensors 712 (e.g., 712A and 712B). The ECU 704 may be one or more ECUs, appropriately programmed, to control one or more operations of the vehicle. The one or more ECUs 704 may be implemented as a single ECU or in multiple ECUs. The ECU 704 may be electrically coupled to some or all of the components of the vehicle. In some embodiments, the ECU 704 is a central ECU configured to control one or more operations of the entire vehicle. In some embodiments, the ECU 704 is multiple ECUs located within the vehicle and each configured to control one or more local operations of the vehicle. In some embodiments, the ECU 704 is one or more computer processors or controllers configured to execute instructions stored in a non-transitory memory 710. All of the elements of the vehicle 702 may be connected via a communications bus.

As described herein, the vehicle sensors 712 are configured to detect sensor data associated with the vehicle and the surroundings of the vehicle, such as vehicle data, location data, image data, and/or proximity data. The vehicle sensors 712 may include a location sensor configured to detect location data of the vehicle, an image sensor (e.g., a camera) configured to detect image data of the surroundings of the vehicle, and/or a remote sensor configured to detect proximity data of the surroundings of the vehicle.

The ECU 704 may use the location data along with map data stored in memory 710 to determine a location of the vehicle. In other embodiments, the location sensor has access to the map data and may determine the location of the vehicle and provide the location of the vehicle to the ECU 704. The location sensor may include a GPS unit, a GLONASS system device, a Galileo system device, or any other global location detection device.

The ECU 704 may use the image data and/or the proximity data to determine obstacle data associated with vehicles and objects around the vehicle that may be outside the field of vision of the driver of the vehicle. As described herein, the ECU 704 may use the obstacle data to determine whether to alert the driver as to whether it is safe to make a passing maneuver.

The input/output device 708 is configured to receive inputs from the user, such as an address to navigate to or a request for determination of whether it is safe to pass another vehicle. The input/output device 708 may include a touchscreen display, a microphone, a keypad, a camera for detecting gestures, or one or more buttons or dials, for example. The input/output device 708 is also configured to provide outputs to the user, such as navigation directions or a warning when it is not safe to pass a vehicle. The input/output device 708 may include a display screen, a heads-up display unit, a speaker, or a vibration unit, for example. The input/output device 708 may include multiple devices and units working together and being instructed by the ECU 704 to receive user input and provide an output to the user.

The memory 710 is connected to the ECU 704 and may be connected to any other component of the vehicle. The memory 710 is configured to store any data described herein, such as the vehicle sensor data, the map data, data received from any other sensors, and any data received from the remote data server 716 or supplemental imaging device 730 via the transceiver 706.

The vehicle 702 may be coupled to a network. The network, such as a local area network (LAN), a wide area network (WAN), a cellular network, a digital short-range communication (DSRC), LORA (Long Range), the Internet, or any other type of interconnectivity or combinations thereof, connects the vehicle 702 to the remote data server 716 and/or the supplemental imaging device 730.

The transceiver 706 may include a communication port or channel, such as one or more of a Wi-Fi unit, a Bluetooth® unit, a Radio Frequency Identification (RFID) tag or reader, a DSRC unit, a LORA unit, or a cellular network unit for accessing a cellular network (such as 3G, 4G, or 5G) or any other wireless technology. The transceiver 706 may transmit data to and receive data from devices and systems not physically connected to the vehicle. For example, the ECU 704 may communicate with the remote data server 716. Furthermore, the transceiver 706 may access the network, to which the remote data server 716 is also connected.

The ECU 704A of a first vehicle 702A determines whether to provide an alert or notification to the driver of the first vehicle 702A regarding passing a second vehicle 702B based on spatial data received from the second vehicle 702B and/or the supplemental imaging device 730. In some embodiments, the ECU 704A analyzes the spatial data (e.g., image data, proximity data) to determine whether it is safe to pass the second vehicle 702B. Map data from the memory 710 and location data from the location sensor may also be used to determine whether it is safe to pass the second vehicle 702B.

Obstacle data associated with vehicles and objects in the vicinity of the first vehicle 702A (but outside of the field of vision of the driver of the first vehicle 702A) may be determined based on the spatial data of the second vehicle 702B. The obstacle data may include distances and relative speeds of the vehicles and objects in the vicinity of the first vehicle 702A, and the obstacle data may be determined by analyzing the spatial data form the second vehicle 702B. The obstacle data may be determined by the ECU 704A of the first vehicle 702A based on the spatial data from the second vehicle 702B, or the obstacle data may be determined by the ECU 704B of the second vehicle 702B and provided to the first vehicle 702A.

When determining the obstacle data, the respective ECU may use machine learning techniques and training data to identify the distances and relative speeds of the nearby vehicles and objects. The respective ECU may also use machine learning techniques to identify the types of vehicles (e.g., a motorcycle, SUV, sedan) or objects (e.g., debris, an animal, a traffic sign).

The supplemental imaging device 730 includes a processor 732, a memory 736, a sensor 738, and a transceiver 734. The supplemental imaging device 730 may be a device configured to provide additional spatial data and/or obstacle data associated with vehicles and objects in the vicinity of vehicles 702. The supplemental imaging device 730 may be a roadside camera, a satellite, or an unmanned aerial vehicle, for example.

The sensor 738 of the supplemental imaging device 730 may be an image sensor configured to detect image data or a remote sensor (e.g., LIDAR, RADAR) configured to detect proximity data. The memory 736 of the supplemental imaging device 730 may be a non-transitory memory configured to store the spatial data detected by the sensor 738. The processor 732 may instruct the transceiver 734 to communicate with vehicles 702 and/or the remote data server 716 to communicate data. In some embodiments, the supplemental imaging device 730 provides the spatial data to the vehicles 702 and/or the remote data server 716. In some embodiments, the processor 732 of the supplemental imaging device 730 determines obstacle data based on the detected spatial data and communicates the obstacle data to the vehicles 702 and/or the remote data server 716.

The transceiver 734 may be similar to the other transceivers (e.g., transceiver 706 and transceiver 720) described herein. The processor 732 may be one or more computer processors or controllers configured to execute instructions stored in non-transitory memory (e.g., memory 736).

The spatial data and/or obstacle data may be communicated from the vehicle 702 to the remote data server 716 via the transceiver 706 of the vehicle 702 and the transceiver 720 of the remote data server 716. The remote data server 716 includes a processor 718, a transceiver 720, and a memory 722, all connected to each other via a communications bus. The processor 718 (and any processors described herein) may be one or more computer processors configured to execute instructions stored on a non-transitory memory.

The memory 722 may be a non-transitory memory configured to store spatial data and/or obstacle data of a plurality of vehicles 702 and map data to be used by those vehicles 702. The transceiver 720 may be configured to transmit and receive data, similar to transceiver 706.

The remote data server 716 may be used to relay data between vehicles 702 when direct communication between vehicles 702 is not possible or not preferable. The remote data server 716 may also be used to relay data from the supplemental imaging device 730 to vehicles 702 when direct communication between the supplemental imaging device 730 and the vehicles 702 is not possible or not preferable.

While only two vehicles 702A-702B are shown, any number of vehicles may be used. Likewise, while only one remote data server 716 is shown, any number of remote data servers in communication with each other may be used. In addition, while only one supplemental imaging device 730 is shown, any number of supplemental imaging devices may be used. Multiple remote data servers may be used to increase the memory capacity of the data being stored across the remote data servers, or to increase the computing efficiency of the remote data servers by distributing the computing load across the multiple remote data servers. Multiple remote data servers may be interconnected using any type of network, or the Internet.

As used herein, a "unit" may refer to hardware components, such as one or more computer processors, controllers, or computing devices configured to execute instructions stored in a non-transitory memory.

Figure 8:
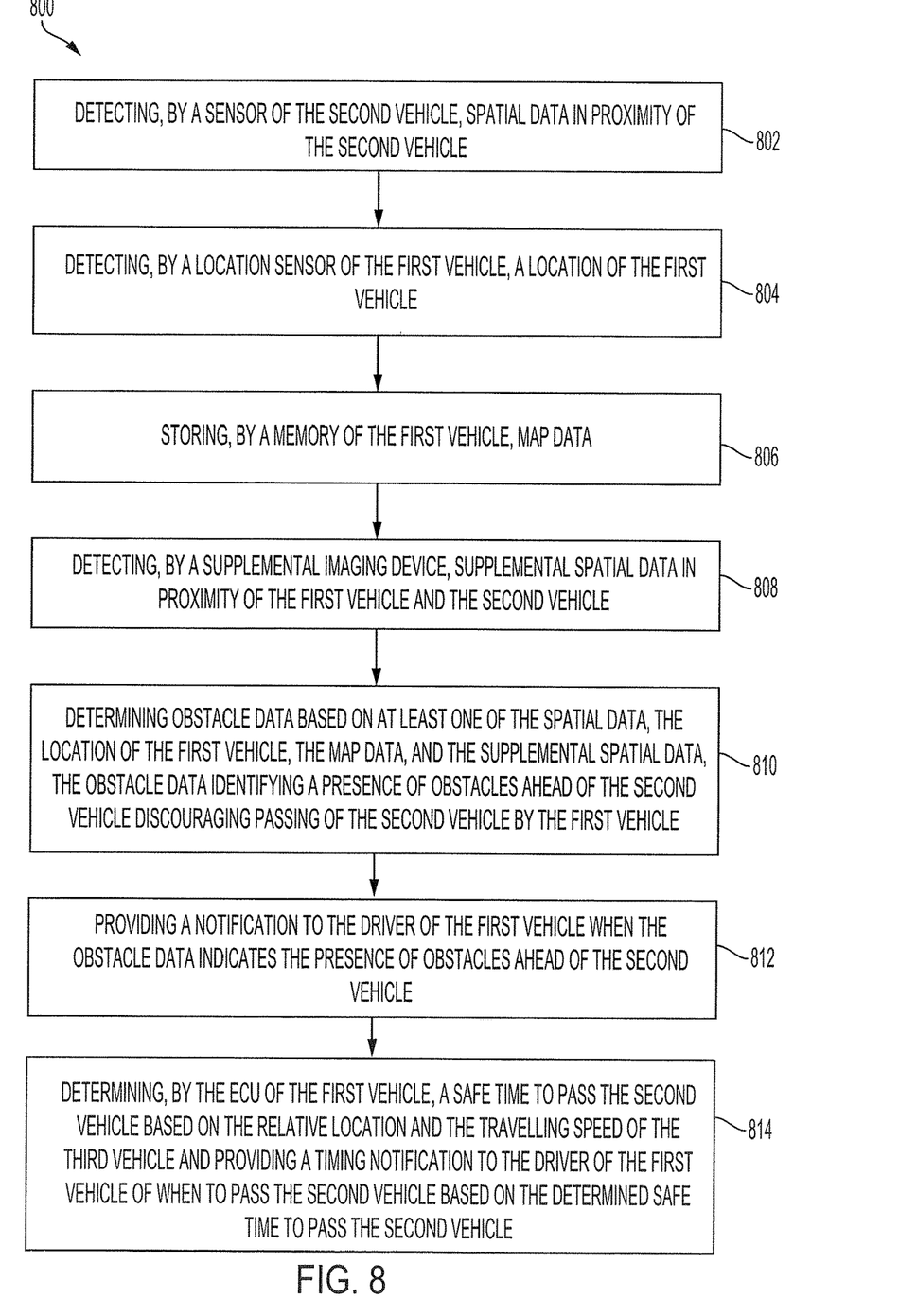
FIG. 8 illustrates a process of the system, according to various embodiments of the invention.

FIG. 8 illustrates a process 800 performed by the system described herein. The process 800 is for notifying a driver of a first vehicle (e.g., vehicle 102, 402, 702A) of obstacles to discourage passing of a second vehicle (e.g., vehicle 104, 406, 702B) in front of the first vehicle.

A sensor (e.g., a sensor of vehicle sensors 712) detects spatial data in proximity of the second vehicle (step 802). The sensor may be an image sensor configured to detect image data or a remote sensor (e.g., RADAR or LIDAR) configured to detect proximity data. In many embodiments, the spatial data pertains to vehicles or objects in front of the second vehicle, which may be obscured from the field of view of the first vehicle.

A location sensor of the first vehicle detects the location of the first vehicle (step 804) and a memory (e.g., memory 710A) of the first vehicle stores map data (step 806). The map data may include a plurality of geographic regions associated with respective road features where passing is discouraged (e.g., intersections, curves of the road, or merging of lanes). As described herein, when the first vehicle is within these geographic regions, passing may be discouraged. The ECU (e.g., ECU 730A) of the first vehicle may compare the location of the first vehicle from the location sensor with the map data to determine whether the first vehicle is within one of these geographic regions where passing is discouraged.

A supplemental imaging device (e.g., supplemental imaging device 730) detects supplemental spatial data in proximity of the first vehicle and the second vehicle (step 808). The supplemental imaging device may be a roadside camera, a satellite, or an unmanned aerial vehicle, for example. As described herein, the supplemental spatial data may be used to warn the driver of the first vehicle of a situation where passing the second vehicle is discouraged.

Obstacle data is determined based on at least one of the spatial data (from the second vehicle), the location of the first vehicle, the map data, or the supplemental spatial data (step 810). The obstacle data may identify the presence of obstacles ahead of the second vehicle, discouraging the passing of the second vehicle by the first vehicle. The obstacle data may include a location of the obstacle (e.g., a third vehicle in front of the second vehicle, an object in the road, or a road feature) and a relative speed of the obstacle.

The spatial data from the second vehicle may be used alone to determine the obstacle data. The spatial data from the second vehicle and the supplemental spatial data from the supplemental imaging device may be used together to determine the obstacle data. The spatial data from the second vehicle and the location of the first vehicle and the map data may be used to determine the obstacle data.

The obstacle data may be determined by the ECU (e.g., ECU 704B) of the second vehicle and communicated from the second vehicle to the first vehicle using a transceiver (e.g., transceiver 706B) of the second vehicle and a transceiver (e.g., transceiver 706A) of the first vehicle. Alternatively, the obstacle data may be determined by the ECU of the first vehicle after receiving the spatial data from the second vehicle via the respective transceivers of the first vehicle and the second vehicle.

The ECU of the first vehicle may obtain the obstacle data from the second vehicle or determine the obstacle data itself and the ECU of the first vehicle may further supplement the obstacle data using the detected location of the first vehicle and the map data. The ECU of the first vehicle may also further supplement the obstacle data using obstacle data obtained from the supplemental imaging device or using supplemental obstacle data determined based on supplemental spatial data received from the supplemental imaging device. The first vehicle and the supplemental imaging device may communicate using respective transceivers (e.g., transceiver 734 and transceiver 706A, respectively).

The ECU of the first vehicle provides a notification to the driver of the first vehicle when the obstacle data indicates the presence of obstacles ahead of the second vehicle (step 812). The ECU of the first vehicle uses an input/output device (e.g., input/output device 708A) to provide the notification to the driver. As described herein, the notification may be at least one of a visual alert on a graphical user interface displayed by a display screen or a heads-up display of the first vehicle, an audible alert provided by a speaker, or a tactile alert provided by a vibration unit of the vehicle. When presented with the notification, the driver of the first vehicle may not perform the passing maneuver around the second vehicle.

The ECU of the first vehicle determines a safe time to pass the second vehicle (step 814). The safe time to pass the second vehicle may be determined based on the relative location and the travelling speed of the third vehicle in front of the second vehicle. The relative location and the travelling speed of the third vehicle may be present in the obstacle data that is received or determined by the first vehicle.

The ECU of the first vehicle provides a timing notification to the driver of the first vehicle of when to pass the second vehicle based on the determined safe time to pass the second vehicle. The timing notification may be provided using the input/output device of the first vehicle. As described herein, the timing notification may be at least one of a visual alert on a graphical user interface displayed by a display screen or a heads-up display of the first vehicle, an audible alert provided by a speaker, or a tactile alert provided by a vibration unit of the vehicle. When presented with the timing notification, the driver of the first vehicle may perform the passing maneuver around the second vehicle.

In some embodiments, a fourth vehicle (e.g., fourth vehicle 404) that is behind the first vehicle detects, using a sensor of the fourth vehicle, spatial data in proximity of the fourth vehicle. The obstacle data determined in step 810 may be further determined using the spatial data in proximity of the fourth vehicle, which may identify the presence of a fifth vehicle (e.g., fifth vehicle 414) behind the fourth vehicle in an adjacent lane. The fifth vehicle may be travelling faster than the first vehicle, and may collide with the first vehicle if the first vehicle were to change lanes to pass the second vehicle. If the presence of a fifth vehicle is detected, the notification is provided, as in step 812.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for notifying a driver or user of a passing vehicle of obstacles discouraging passing of a leading vehicle in front of the passing vehicle, the system comprising:
   an electronic control unit (ECU) configured to:
      receive, from a transceiver on or within a trailing vehicle behind the passing vehicle, spatial data in proximity of the trailing vehicle,
      determine, based at least on the spatial data, obstacle data including a presence of another vehicle in proximity of the trailing vehicle in an adjacent lane that discourages the passing of the leading vehicle by the passing vehicle,
      determine, based on the obstacle data, whether the passing of the leading vehicle by the passing vehicle is safe, and
      provide a notification to the driver or user of the passing vehicle that includes a countdown timer indicating an amount of time remaining until the passing of the leading vehicle by the passing vehicle becomes safe.

2. The system of claim 1, wherein the notification is at least one of a visual alert on a graphical user interface displayed by a display screen or a heads-up display, an audible alert provided by a speaker, or a tactile alert provided by a vibration unit.

3. The system of claim 1, wherein the obstacle data includes at least one of a third vehicle or an object attached to the third vehicle.

4. The system of claim 1, wherein the obstacle data includes one or more road features ahead of the leading vehicle that discourage the passing of the leading vehicle by the passing vehicle, the one or more road features including a curved portion of a roadway that reduces visibility of oncoming traffic.

5. The system of claim 1, wherein the determination of the obstacle data is further based on map data including a plurality of geographic regions associated with respective road features where passing is discouraged, and
   wherein the ECU is further configured to determine the obstacle data by determining whether a location of the passing vehicle is within a geographic region associated with a road feature where passing is discouraged.

6. The system of claim 4, wherein the one or more road features further include at least one of an intersection or a merging of lanes.

7. The system of claim 1, further comprising a supplemental imaging device configured to detect supplemental spatial data in proximity of the passing vehicle and the leading vehicle, and
   wherein the ECU is further configured to:
      receive the supplemental spatial data from the supplemental imaging device, and
      determine the obstacle data further based on the supplemental spatial data.

8. The system of claim 1, wherein the obstacles in proximity of the leading vehicle include a third vehicle,
   wherein the obstacle data includes a relative location and a travelling speed of the third vehicle, and
   wherein the ECU is further configured to determine the relative location and the travelling speed of the third vehicle based on proximity data from the leading vehicle.

9. The system of claim 8, wherein the ECU is further configured to determine the amount of time remaining until the passing of the leading vehicle by the passing vehicle becomes safe based on the relative location and the travelling speed of the third vehicle.

10. The system of claim 1, wherein the ECU is further configured to:
    determine, based on the obstacle data, that the another vehicle is travelling at a speed faster than a speed of the passing vehicle, and
    provide another notification to the driver or user of the passing vehicle based on the obstacle data indicating the presence of the another vehicle in the adjacent lane travelling faster than the passing vehicle, to discourage lane change by the passing vehicle.

11. A system for notifying a driver or user of a passing vehicle of obstacles discouraging passing of a leading vehicle in front of the passing vehicle, the system comprising:
    an electronic control unit (ECU) configured to:
       receive proximity data in front of the leading vehicle, the proximity data detected by a first sensor,
       determine, based on the proximity data, obstacle data including one or more road features ahead of the leading vehicle that discourage the passing of the leading vehicle by the passing vehicle,
       determine, based on the obstacle data, whether the passing of the leading vehicle is safe,
       receive spatial data in proximity of a trailing vehicle located behind the passing vehicle, the spatial data detected by a second sensor,
       determine supplemental obstacle data based on the spatial data and identifying a presence of another vehicle in proximity of the trailing vehicle, the another vehicle travelling at a speed faster than a speed of the passing vehicle, and
       provide, to the driver or user of the passing vehicle, a first notification that includes an amount of time remaining until the passing of the leading vehicle by the passing vehicle becomes safe and a second notification that indicates the presence of the another vehicle in proximity of the trailing vehicle.

12. The system of claim 11, wherein the first notification is at least one of a visual alert on a graphical user interface displayed by a display screen or a heads-up display, an audible alert provided by a speaker, or a tactile alert provided by a vibration unit.

13. The system of claim 11, wherein the one or more road features ahead of the leading vehicle that discourage the passing of the leading vehicle by the passing vehicle include a curved portion of a roadway that reduces visibility of oncoming traffic.

14. The system of claim 13, wherein the determination of the obstacle data is further based on map data including a plurality of geographic regions associated with respective road features where passing is discouraged, and
wherein the ECU is configured to determine a presence of the one or more road features ahead of the leading vehicle by determining whether a location of the passing vehicle is within a geographic region associated with a road feature where passing is discouraged.

15. The system of claim 11, further comprising an imaging device configured to detect supplemental spatial data in proximity of the passing vehicle and the leading vehicle and determine additional obstacle data based on the detected supplemental spatial data, and
wherein the ECU is further configured to provide another notification to the driver or user of the passing vehicle when the additional obstacle data indicates a presence of the obstacles ahead of the leading vehicle.

16. The system of claim 11, wherein the obstacles in proximity of the leading vehicle include a third vehicle,
wherein the obstacle data includes a relative location and a travelling speed of the third vehicle, and
wherein the ECU is further configured to determine the relative location and the travelling speed of the third vehicle based on the proximity data from the leading vehicle.

17. The system of claim 16, wherein the ECU is further configured to determine the amount of time remaining until the passing of the leading vehicle by the passing vehicle becomes safe based on the relative location and the travelling speed of the third vehicle.

18. The system of claim 11,
wherein the ECU is further configured to:
determine, based on the spatial data, that the another vehicle is behind the trailing vehicle in an adjacent lane.

19. A method for notifying a driver or user of a passing vehicle of obstacles discouraging passing of a leading vehicle in front of the passing vehicle, the method comprising:
receiving, by a transceiver, proximity data in front of the leading vehicle;
determining, by an electronic control unit (ECU) and based on the proximity data, obstacle data including one or more road features ahead of the leading vehicle that discourage the passing of the leading vehicle by the passing vehicle;
receiving, by the transceiver and from a trailing vehicle located behind the passing vehicle, supplemental obstacle data identifying a presence of a second trailing vehicle behind the trailing vehicle in an adjacent lane, the second trailing vehicle travelling at a speed faster than a speed of the passing vehicle;
determining, by the ECU and based on the obstacle data and the supplemental obstacle data, whether the passing of the leading vehicle by the passing vehicle is safe; and
providing a notification to the driver or user of the passing vehicle that indicates a remaining time until a safe time for the passing of the leading vehicle by the passing vehicle.

20. The method of claim 19, wherein the one or more road features ahead of the leading vehicle that discourage the passing of the leading vehicle by the passing vehicle include a curved portion of a roadway that reduces visibility of oncoming traffic.

* * * * *